United States Patent [19]

Lockhart et al.

[11] Patent Number: 5,100,932
[45] Date of Patent: Mar. 31, 1992

[54] GELLABLE BUFFERED AQUEOUS COMPOSITION AND ITS USE IN ENHANCED PETROLEUM RECOVERY

[75] Inventors: Thomas P. Lockhart, Donato Milanese; Giovanni Burrafato, Tavazzano, both of Italy

[73] Assignees: Eniricerche S.p.A.; Agip S.p.A., both of Milan, Italy

[21] Appl. No.: 499,681

[22] Filed: Mar. 27, 1990

[30] Foreign Application Priority Data

Mar. 31, 1989 [IT] Italy ............................. 19969 A/89

[51] Int. Cl.$^5$ ............................................... C09K 7/00
[52] U.S. Cl. .................................... 523/130; 166/294; 166/295
[58] Field of Search ................. 523/130; 166/294, 295

[56] References Cited

U.S. PATENT DOCUMENTS 3,615,794 10/1971 Mimerick ........................... 523/130
4,606,407 8/1986 Shu ..................................... 166/270

Primary Examiner—Joseph L. Schofer
Assistant Examiner—Jeffrey T. Smith
Attorney, Agent, or Firm—Oblon, Spivak, McClelland, Maier & Neustadt

[57] ABSTRACT

A gellable aqueous composition particularly suitable for reducing the permeability of high-permeability zones in an oil reservoir is an aqueous solution comprising:
a) a water-soluble organic polymer cross-linkable by the effect of a polyvalent metal ion cross-linking agent;
b) a Cr(III) ion cross-linking agent;
c) a buffer agent free or subtantially free of ligand characteristics towards the cross-linking agent, and chosen from organic bases and aromatic carboxylic or sulphonic acids;

the solution pH being adjusted to a value within the range of about 2 to about 7.

14 Claims, 1 Drawing Sheet

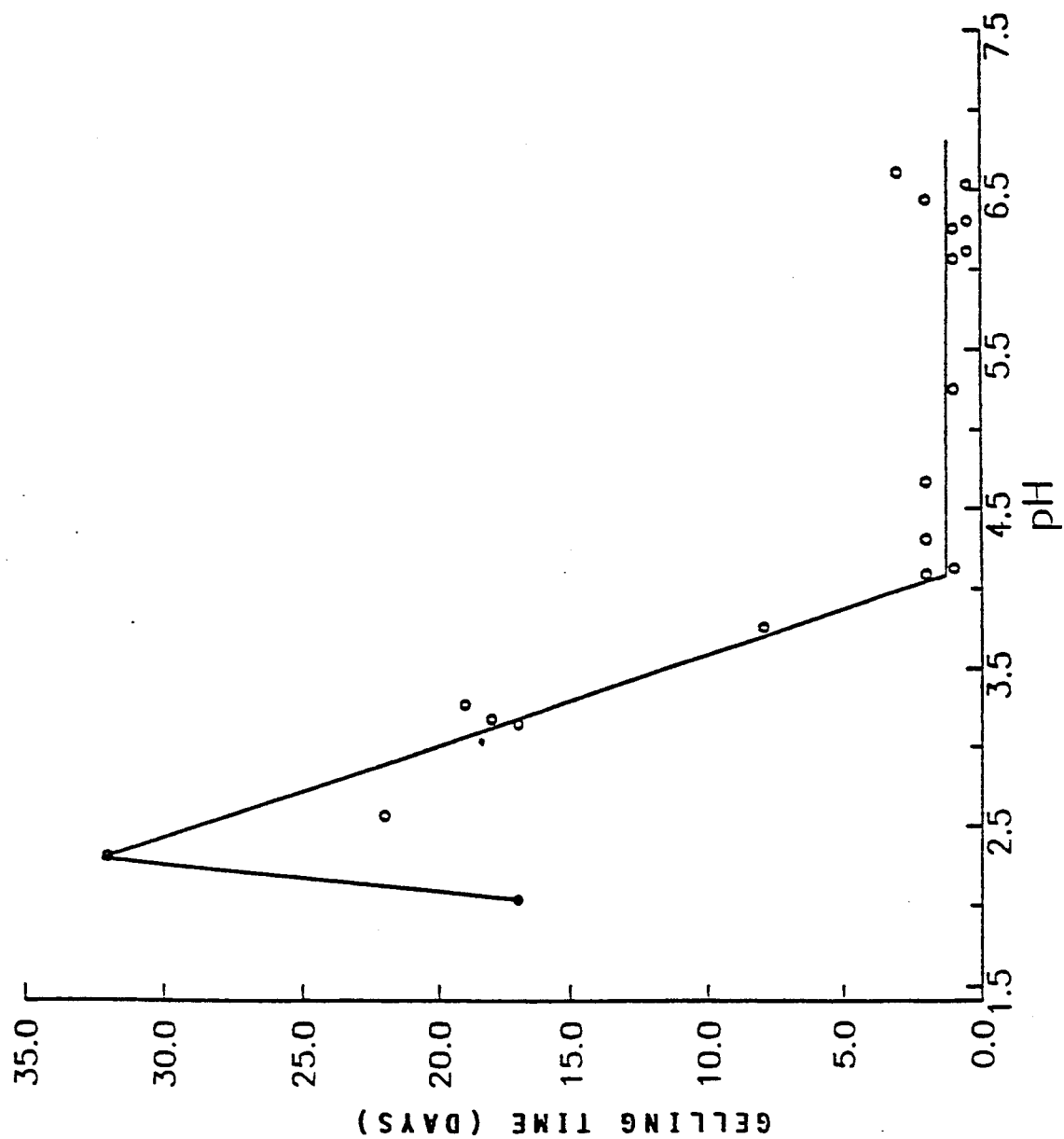

GELLABLE BUFFERED AQUEOUS COMPOSITION AND ITS USE IN ENHANCED PETROLEUM RECOVERY

This invention relates to a gellable aqueous composition of adjustable gelling time, which is particularly suitable for reducing the permeability of high-permeability zones in an oil reservoir. The invention also relates to a method for reducing permeability in a reservoir using said gellable composition. The so-called primary recovery methods for petroleum make use of the natural energy of the reservoir or mechanical means to produce petroleum from the wells; however, these methods are known to allow only partial extraction of the crude contained in the reservoir. To increase the extractable petroleum quantity it is therefore usual to employ secondary recovery techniques, consisting essentially of introducing into the reservoir a fluid, generally water or an aqueous polymer solution, which conveys the crude through the pores in the rock to the extraction well. However, because many reservoir are composed of several types of rock having different permeability, the injected fluid tends to channel through the zones of greater permeability, without flushing or only partly flushing the zones of lesser permeability. This behavior can limit severly recovery of the petroleum from the reservoir.

To solve this problem, use can be made of one of the techniques for enhanced petroleum recovery based on the at least partial occlusion of the high permeability zones. This is accomplished by feeding a gellable aqueous petroleum solution into the reservoir through one or more wells, to form polymer gels in situ. In this manner it is possible to deviate the flow of fluids subsequently fed into the reservoir towards the zones of lesser permeability and thus recover the crude contained in them.

The gellable solutions used for this purpose are normally an aqueous solution of a water-soluble polymer such as a polyacrylamide, a partly hydrolyzed polyacrylamide, or a biopolymer such as xanthan gum, cross-linkable by the effect of an ion of a polyvalent metal, normally Cr(III) or Al(III). Moreover, as the zones to be occluded can be very large and/or at a more or less great distance from the injection well, the gelling solution must have delayed gelation in order to allow the solution to reach the high permeability zones of the reservoir and to fill them completely.

The technical problem of delayed gelation has been confronted in various ways. Thus, in one known method described for example in U.S. Pat. No. 3,785,437, an aqueous solution containing the cross-linkable polymer and a hexavalent chromium salt unable in itself to cross-link the polymer is injected into the reservoir. The chromium is then reduced to the trivalent state at a slow reduction rate by means of a reducing agent (such as thiourea or bisulphite) either contained in the gellable solution or injected into the reservoir in the form of an aqueous solution, subsequent to the injection of the gellable solution, so as to induce gelling due to the mixing of the injected solutions in the reservoir.

This Cr(VI)/reductant method, has the advantage that it is possible to obtain gelation with a one-component gellable composition; it has the drawback, however of toxicity of hexavalent chromium and its consequent impact on the environment.

In the case of sequential injection, the drawbacks include the incomplete mixing of the injected solutions, so that the gel forms only at their interface, and is therefore thin and easily deteriorates. U.S. Pat. No. 3,762,476 describes a gellable composition useful for correcting permeability in an underground reservoir, which comprises a cross-linkable polymer and a cross-linking agent in the form of an ion of a polyvalent metal complexed with certain anions having sequestering and delaying characteristics. According to the description of this patent, the solution of the complexed cross-linking agent is injected into the reservoir after injecting the polymeric aqueous solution, and thus the aforesaid drawbacks inherent in sequential injection are not overcome.

U.S. Pat. No. 4,683,949 describes gellable aqueous compositions useful in petroleum enhanced recovery methods which contain a water-soluble polyacrylamide and a cross-linking agent in the form of a Cr(III) complex with a carboxylate ion, and more particularly an aliphatic monocarboxylic acid ion, especially an acetate ion. The use of this composition avoids the problems relative to sequential injection, however the resultant delay in cross-linking is only modest. Consequently these compositions are unsuitable for positioning the gel in deep zones in the reservoir, as is normally required in practice.

The present inventors have found that aqueous solutions containing a cross-linkable organic polymer and a Cr(III) ion cross-linking agent gel at a rate dependent on the pH value within the gelling pH range. However it should be noted that when the said gellable solutions are injected into a oil reservoir they undergo pH changes due to hydrolysis, to mixing with the reservoir water, and/or to the chemical nature of the rock with which they come into contact, the overall effect being one of premature gelling. This introduces a further uncertainty factor in the estimation of the gelling rate and thus in the correct positioning of the gel within the reservoir.

It would therefore be desirable to have available gellable aqueous solutions having a gelling time controllable within a wide range and independent or substantially independent of the characteristics of the treated reservoir.

This has been found possible by means of the gellable compositions of the present invention, which contain particular buffer agents in addition to a cross-linkable polymer and the cross-linking agent.

In accordance therewith, one aspect of the present invention is a gellable aqueous composition particularly suitable for reducing the permeability of high-permeability zones in an oil reservoir, which is in the form of an aqueous solution comprising:

a) a water-soluble organic polymer cross-linkable by the effect of a polyvalent metal ion cross-linking agent;

b) a Cr(III) ion cross-linking agent; and c) a buffer agent free or substantially free of binding characteristics towards the cross-linking agent, and chosen from organic bases and aromatic carboxylic or sulphonic acids having a pKa of between about 0.5 and about 8;

the component a) being present in a quantity of between 1000 and 50,000 ppm; the component b) being present in a quantity of between 10 and 5000 ppm; the weight ratio of component a) to component b) varying from 1:1 to 1000:1; the component c) being present at a concentration of between 0.005M and 0.5M; the composition pH being adjusted to a value within the range of about 2 to about 7.

In the present description, ppm means parts per million by weight. Water-soluble polymers useful for the purposes of the present invention are water-soluble biopolymers and synthetic polymers of high molecular weight comprising carboxylic acid groups and able to gel in the presence of the cross-linking agent within the cross-linking pH range (pH between about 2 and about 7). The biopolymers comprise polysaccharides and modified polysaccharides. Examples of biopolymers are xanthan gum, guar gum, carboxymethyl cellulose, hydroxyethyl cellulose, hydroxypropyl cellulose and modified starches. Synthetic polymers useful for the purpose include acrylamide polymers such as polyacrylamide, partially hydrolyzed polyacrylamide and the copolymers of acrylamide with one or more copolymerizable monomers. The weight average molecular weight of these polymers and copolymers can generally vary from 100,000 to 20,000,000 and their concentration in the composition can vary from 1000 to 50,000 ppm.

In the preferred embodiment, acrylamide polymers or their partial hydrolysis products with a weight average molecular weight of between 200,000 and 12,000,000 are used, in a concentration varying from 4000 to 30,000 ppm.

The cross-linking agent useful for the purposes of the present invention is the Cr(III) ion and therefore the water-soluble organic salts of this metal such as the chloride, nitrate or sulphate are used. The concentration of the cross-linking agent in the composition, expressed as metal, can vary between 10 and 5000 ppm and preferably between 25 and 500 ppm.

The weight ratio of the water-soluble organic polymer to the cross-linking agent is maintained between 1:1 and 1.000:1, and preferably between 5:1 and 500:1.

The buffer agents useful for the purposes of the present invention are organic bases or aromatic carboxylic or sulphonic acids having as pKa of between about 0.5 and about 8 and free or substantially free of ligand characteristics towards the cross-linking agent. Examples of such organic bases are aliphatic or aromatic organic amines such as aniline, 2-bromoaniline, 3-bromoaniline, 4-chloroaniline, 4-nitroaniline, diphenylamine and propane-1,2-diamine. Other examples of organic bases are heterocyclic organic compounds containing at least one nitrogen heteroatom in the ring such as thiazole, 2-aminothiazole, piperazine, imidazole, benzimidazole, quinoline, isoquinoline, piperidine, pyridine, 2,4-lutidine, 3-chloropyridine and o-toluidine. Examples of aromatic carboxylic or sulphonic acids are benzoic acid, 2-nitrobenzoic acid, 2-chlorobenzoic acid and benzenesulphonic acid.

Conveniently, a buffer agent concentration of between 0.005M and 0.5M, and preferably between 0.0075M and 0.1M, is maintained within the composition of the present invention.

In addition, the composition of the present invention has a pH within the composition gelling range, which can generally vary from about 2 to about 7, the selected value depending from desirable gelling time. Consequently, when necessary or desirable, the pH value of the composition can be adjusted by adding a mineral acid such as hydrochloric acid or perchloric acid, or an inorganic base such as sodium hydroxide. It should be noted that at pH values exceeding 7 colloidal $Cr(OH)_3 \cdot 3H_2O$, which is inactive for gelling purposes, forms so that it is not possible to operate at such pH values.

The use of the buffer agent according to the present invention enables the pH of the gellable solution to be kept constant for a prolonged time period or at least to considerably slow down the pH variation induced by the nature of the treated reservoir, to allow good control of the gelling time in all cases.

In general, it is important to maintain a preferred pH value over long time periods in environments in which there is a natural tendency for aqueous gels or gellable solutions to transform into one having a less desirable pH. Such a pH change can for example occur at high temperature at which chemical transformations such as hydrolysis of the polymer lead to an undesirable pH change. In other cases an undesirable pH change can occur by contact between the gel and other aqueous solutions or chemical agents. The undesirable pH change could result in decreased long-term stability of the gel, or a change in gelling rate. This latter problem introduces considerable uncertainty for example in the attempt to properly place a gellable composition in a certain position within an oil reservoir for the purpose of profile modification. In other cases the pH could be chosen for the purpose of reducing corrosion where the gellable solution comes into contact with metal equipment, or to produce a gellable solution and a final gel which are not harmful if coming into contact with the human skin or eyes.

According to a further aspect, the present invention provides a gelling method in which the gellable solution is injected into the oil reservoir and penetrates substantially into that zone of the reservoir to be treated, before undergoing gelling.

This method therefore comprises:
preparing the aforesaid gellable composition on the surface under controlled conditions;
injecting this prepared composition into the oil reservoir through at least one well;
moving the composition through the reservoir until it reaches and substantially fills the high-permeability zone to be treated; and
gelling the composition in situ with consequent lowering of the permeability of said high-permeability zone.

The gellable aqueous composition is prepared by simply mixing the constituents, operating under ambient temperature conditions. The order of addition of the constituents is not critical, however in a preferred embodiment an aqueous solution of the water-soluble organic polymer and buffer agent is firstly prepared, the pH being adjusted by a mineral acid or inorganic base. An aqueous solution of the cross-linking agent is prepared separately. The two prepared solutions are then mixed together.

Other sectors in which the composition of the present invention can be used include linings, foams and the preparation of corrosive films for metals.

As will be apparent from the experimental examples given hereinafter, the use of the buffer agents according to the present invention enables the gellable aqueous compositions to undergo a gelling delay which is adjustable in terms of gelling time as a function of the pH within a wide range of values. Furthermore, this gelling time is insensitive or at most only slightly sensitive to the nature of the treated reservoir. Moreover, gelling occurs both at ambient temperature and at higher than ambient temperature, with the formation of stable, compact gels.

It is therefore possible to prepare gellable aqueous solutions suitable for the most diverse conditions which can be encountered in an oil reservoir.

The following experimental examples are given by way of non-limiting illustration.

EXAMPLE 1

Aqueous solutions are prepared in distilled water containing 8,000 ppm of a commercial polyacrylamide (1% hydrolysis, weight average molecular weight 5,000,000–6,000,000), 50 ppm of Cr(III) supplied in the form of Cr(III) chloride or nitrate, a buffer agent and perchloric acid in the quantity necessary to adjust the pH to the required value. The times (in days) required for the solutions to completely gel at a temperature of 25° and 60° C. are noted. The results obtained are given in the following table.

| pH | buffer | buffer conc. (M) | gelling time (days) 25° C. | gelling time (days) 60° C. |
|---|---|---|---|---|
| 2.31 | 3-Cl-pyridine | 0.06 | (*) | 32 |
| 3.18 | 3-Cl-pyridine | 0.03 | (*) | 18 |
| 3.27 | 3-Cl-pyridine | 0.03 | (—) | 19 |
| 4.13 | o-toluidine | 0.03 | 11 | 1 |
| 5.25 | pyridine | 0.03 | 1 | 1 |
| 6.06 | 2,4-lutidine | 0.015 | 1 | 1 |
| 6.11 | pyridine | 0.06 | 0.5 | 0.5 |
| 6.25 | 2,4-lutidine | 0.015 | 1 | 1 |
| 6.30 | imidazole | 0.03 | 0.5 | 0.5 |
| 6.43 | 2,4-lutidine | 0.015 | 1 | 2 |
| 6.53 | imidazole | 0.03 | (—) | 0.5 |
| 6.60 | imidazole | 0.03 | 3 | 3 |

(*) not gelled after 234 days
(—) test not carried out.

The pH of the compositions was periodically checked with a microelectrode, and it was found that the pH varied by less than 0.2 units over a period of 46 days.

EXAMPLE 2

The procedure of Example 1 was followed, preparing gellable compositions containing buffer agents in the form of aromatic carboxylic and sulphonic organic acids at a concentration of 0.0075M with the exception of benzenesulphonic acid, the concentration of which was 0.01M. The test results are given in the following table.

| Buffer agent | solution pH | gelling time (days) 25° C. | gelling time (days) 60° C. |
|---|---|---|---|
| Benzenesulphonic acid | 2.04 | (**) | 17 |
| 2-nitrobenzoic acid | 2.57 | (*) | 22 |
| 2-nitrobenzoic acid | 3.15 | (*) | 17 |
| 2-nitrobenzoic acid | 3.76 | 56 | 8 |
| 2-chlorobenzoic acid | 4.09 | 19 | 2 |
| 2-chlorobenzoic acid | 4.31 | 11 | 2 |
| 2-chlorobenzoic acid | 4.67 | 11 | 2 |

(*) not gelled after 81 days
(**) not gelled after 44 days.

Those results of experimental Examples 1 and 2 conducted at 60° C. are reproduced on the graph of the Figure in which the horizontal axis indicates the pH of the gellable solution and the vertical axis the gelling time expressed in days.

EXAMPLE 3

Gellable aqueous solutions of controlled pH are prepared containing 8,000 ppm of the polyacrylamide of Example 1, 50 ppm of Cr(III) and a buffer agent. These solutions are gelled at 60° C. The test details are given in the following table.

| Buffer agent | solution pH | gelling time (days) 60° C. |
|---|---|---|
| benzimidazole | 5.7 | <1 |
| quinoline | 5.5 | <1 |
| 2-aminothiazole | 5.5 | <1 |
| piperazine | 5.5 | <1 |
| benzoic acid | 5.5 | 1 |

EXAMPLE 4

Gellable aqueous solutions of controlled pH were prepared following the procedure of Example 1.

These solutions are gelled at 90° C. and the test results are given in the following table.

| Buffer agent (0,1M) | solution pH | gelling time (hours) |
|---|---|---|
| 3-Cl-pyridine | 2.1 | 21 |
| 3-Cl-pyridine | 2.4 | 17 |
| 3-Cl-pyridine | 2.5 | 15.5 |
| 3-Cl-pyridine | 3.4 | 3.9 |
| benzoic acid | 3.7 | 0.8 |
| benzoic acid | 4,3 | 0.5 |
| pyridine | 4,7 | 0.2 |

EXAMPLE 5

Comparison

Gellable aqueous solutions of controlled pH are prepared containing 8,000 ppm of the polyacrylamide of Example 1, 50 ppm of Cr(III) and a buffer agent having binding characteristics towards the Cr(III). These solutions are gelled at 25° and 60° C. The test details are given in the following table.

| Buffer agent | solution pH | gelling time (days) 25° C. | gelling time (days) 60° C. |
|---|---|---|---|
| oxalate | 4.57 | (*) | (*) |
| citrate | 4.89 | (*) | (*) |
| acetate | 4.99 | (*) | 15 |
| tartrate | 4.98 | (*) | (*) |
| malonate | 5.41 | (*) | (*) |

(*) not gelled after 41 days.

As is apparent from Example 5, the traditional oxalate, citrate, acetate, tartrate and malonate buffer agents interfere with gelling, either blocking it completely or producing weak gels. One aspect of the present invention consists of identifying the various chemical compound classes which function effectively as buffer agents without interfering with the gelling chemistry. Without wishing to support a particular theory, it is suggested that the lack of success of solutions buffered with the traditional buffers can be attributed to the complexing of these chemical agents with the cross-linking metal ion, so blocking its reaction with the polymer. In support of this mechanism, it should be noted that the effective buffers of the present invention are substantially free of binding characteristics towards Cr(III); this is considered an essential requirement for any effective buffer.

We claim:

1. A gellable aqueous composition able to reduce the permeability of high-permeability zones in an oil reservoir in the form of an aqueous solution consisting essentially of:
   a) a water-soluble organic polymer cross-linkable by a polyvalent metal ion cross-linking agent;
   b) a Cr(III) ion cross-linking agent;
   c) a buffer agent free or substantially free of ligand characteristics towards the cross-linking agent, being an organic base or an aromatic carboxylic or sulphonic acid having a pKa of between about 0.5 and about 8;

the component a) being present in a quantity of between 1000 and 50,000 ppm; the component b) being present in a quantity of between 10 and 5000 ppm; the weight ratio of component a) to component b) varying from 1:1 to 1000:1; the component c) being present at a concentration of between 0.005M and 0.5M; the composition pH being adjusted to a value within the range of about 2 to 7.

2. A composition as claimed in claim 1, wherein the water-soluble organic polymer is a biopolymer or a water-soluble synthetic polymer.

3. A composition as claimed in claim 2, wherein said biopolymer is xanthan gum, guar gum, carboxymethyl cellulose, hydroxyethyl cellulose or modified starches.

4. A composition as claimed in claim 2, wherein said water-soluble synthetic polymer is a polyacrylamide, partially hydrolyzed polyacrylamide or an acrylamide copolymer with one or more copolymerizable monomers.

5. A composition as claimed in claim 1, wherein the water-soluble organic polymer has a weight average molecular weight of between 100,000 and 20,000,000.

6. A composition as claimed in claim 5, wherein said weight average molecular weight varies from 200,000 to 12,000,000.

7. A composition as claimed in claim 1, wherein the concentration of the water-soluble organic polymer in the composition varies from 4,000 to 30,000 ppm.

8. A composition as claimed in claim 1, wherein the cross-linking agent is in the form of Cr(III) chloride, nitrate or sulphate.

9. A composition as claimed in claim 1, wherein the concentration of said cross-linking agent in the composition varies from 25 to 500 ppm.

10. A composition as claimed in claim 1, wherein said weight ratio of water-soluble organic polymer to cross-linking agent varies from 5:1 to 500:1.

11. A composition as claimed in claim 1, wherein the organic base buffer agent is an aliphatic or aromatic organic amine or a heterocyclic organic compound containing at least one nitrogen heteroatom in the ring.

12. A composition as claimed in claim 11, wherein said organic base is aniline, 2-bromoaniline, 3-bromoaniline, 4-chloroaniline, 4-nitroaniline, diphenylamine, propane-1,2-diamine, thiazole, 2-aminothiazole, piperazine, imidazole, benzimidazole, quinoline, isoquinoline, piperidine, pyridine, 3,4-lutidine, 3-chloropyridine or o-toluidine.

13. A composition as claimed in claim 1, wherein the aromatic carboxylic or sulphonic acid buffer agent is benzoic acid, 2-nitrobenzoic acid, 2-chlorobenzoic acid or benzenesulphonic acid.

14. A composition as claimed in claim 1, wherein the concentration of said buffer agent varies from 0.0075 to 0.1M.

* * * * *